United States Patent [19]
Yamasaki

[11] Patent Number: 5,627,586
[45] Date of Patent: May 6, 1997

[54] MOVING BODY DETECTION DEVICE OF CAMERA

[75] Inventor: Masafumi Yamasaki, Tokyo, Japan

[73] Assignee: Olympus Optical Co., Ltd., Tokyo, Japan

[21] Appl. No.: 45,039

[22] Filed: Apr. 8, 1993

[30] Foreign Application Priority Data

| Apr. 9, 1992 | [JP] | Japan | 4-088630 |
| Apr. 9, 1992 | [JP] | Japan | 4-088631 |
| Apr. 9, 1992 | [JP] | Japan | 4-089091 |

[51] Int. Cl.$^6$ .............................. H04N 5/225; G06K 9/00
[52] U.S. Cl. .......... 348/169; 348/208; 348/699; 348/700; 348/352; 382/103; 382/107
[58] Field of Search ...................... 348/345, 208, 348/699, 700, 413, 414, 416, 333, 222, 169, 170, 352, 349, 353; 354/400, 430; 382/103, 107, 236; 250/203.1; 342/76; H04N 5/225

[56] References Cited

U.S. PATENT DOCUMENTS

| 4,965,443 | 10/1990 | Yamasaki et al. | 250/201.7 |
| 5,012,270 | 4/1991 | Sekine et al. | 354/430 |
| 5,019,901 | 5/1991 | Uomori et al. | 348/699 |
| 5,128,768 | 7/1992 | Suda et al. | 348/352 |
| 5,196,929 | 3/1993 | Miyasaka | 348/169 |
| 5,257,209 | 10/1993 | Markandey | 364/516 |
| 5,259,040 | 11/1993 | Hanna | 382/107 |

FOREIGN PATENT DOCUMENTS

| 59-32743 | 8/1984 | Japan | H04N 7/18 |
| 2-5 | 1/1990 | Japan | G02B 7/28 |
| 2-65834 | 3/1990 | Japan | A61B 3/113 |
| 2-96707 | 4/1990 | Japan | G02B 7/28 |
| 3-177828 | 8/1991 | Japan | G03B 13/36 |
| 4-114135 | 4/1992 | Japan | G03B 13/04 |

OTHER PUBLICATIONS

Uomori et al., "Automatic Image Stabilizing System by Full–Digital Signal Processing", Aug., 1990, IEEE Trans. on Consumer Electronics, vol. 36, No. 3; pp. 510–519.

Institute of Electronic and Communication Engineers of Technical Papers PRU88–73, pp. 17–24, A Method of Feature Point Extraction for Non–Contact Eye Movement Detection, Akira Tomono et al.

Primary Examiner—John K. Peng
Assistant Examiner—Andrew B. Christensen
Attorney, Agent, or Firm—Frishauf, Holtz, Goodman, Langer & Chick

[57] ABSTRACT

In a moving body detection device of a camera in this invention, in order to correctly detect an area in which a target moving body is present even when the camera moves, an area in which the moving body is present is detected from a plurality of divided areas by comparing respective motion vectors. Further, in the moving body detection device of a camera in this invention, an image of an object derived by use of a video camera is detected by a CPU via a Y/C separation circuit, A/D converter circuit and video RAMs. Motion vectors of image portions are detected from the two image portions which are extracted at two different timings from desired first and second preset areas of the detected image displayed on a display unit by means of the CPU, video RAMs, RAM and ROM. Then, whether an object which is present in the first preset area is a moving body or not is determined by the CPU based on the detected motion vector of the image.

5 Claims, 16 Drawing Sheets

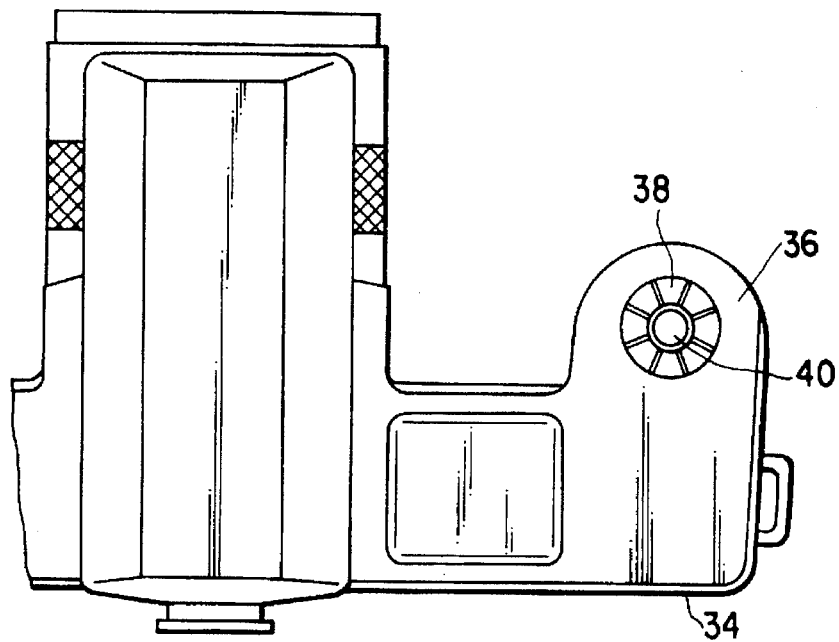
F I G. 3
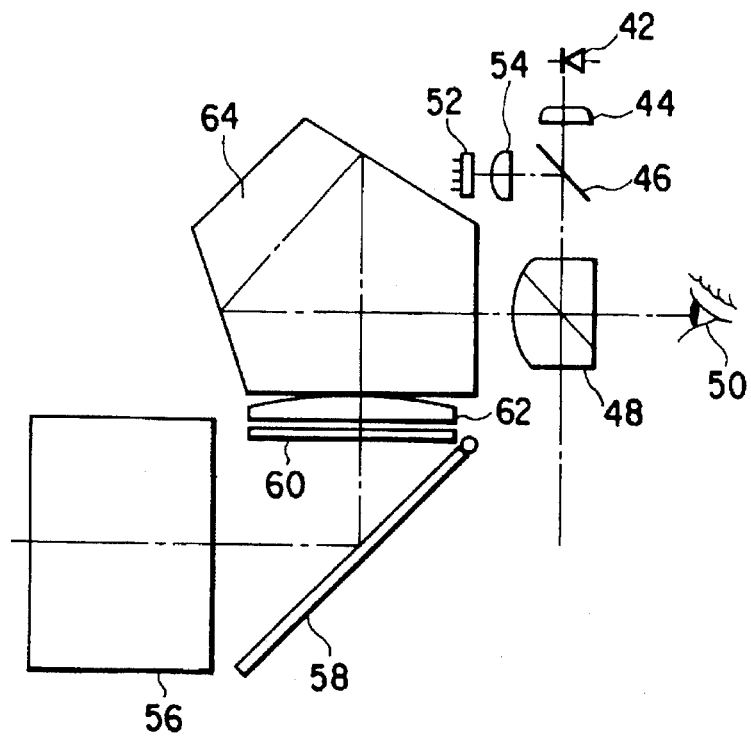
F I G. 4

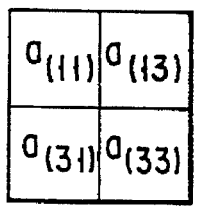 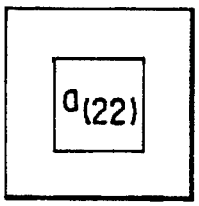 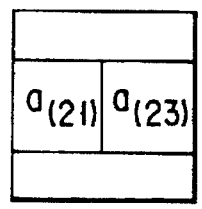 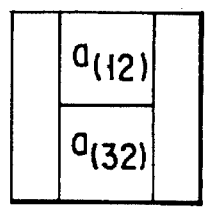
FIG. 7A    FIG. 7B    FIG. 7C    FIG. 7D
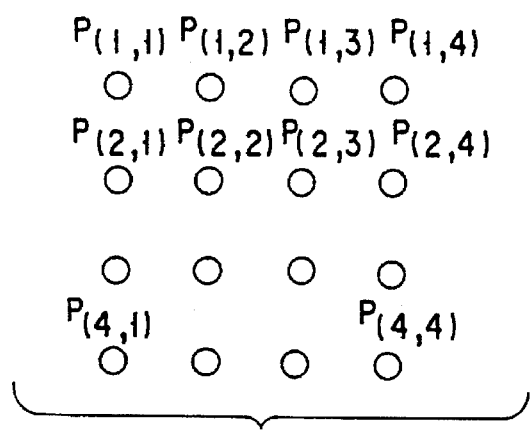
FIG. 8
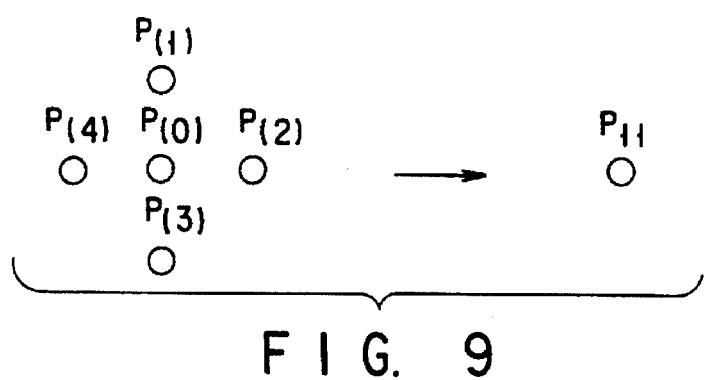
FIG. 9

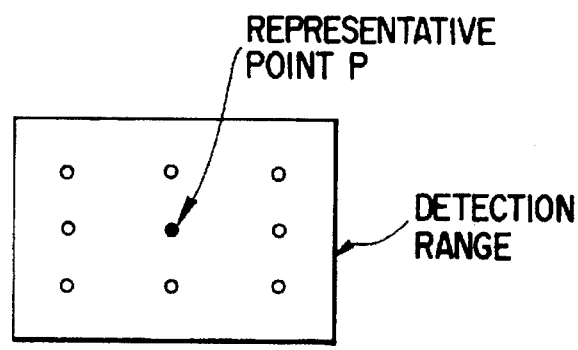
FIG. 10A $t_0$
FIG. 10B $t_1$
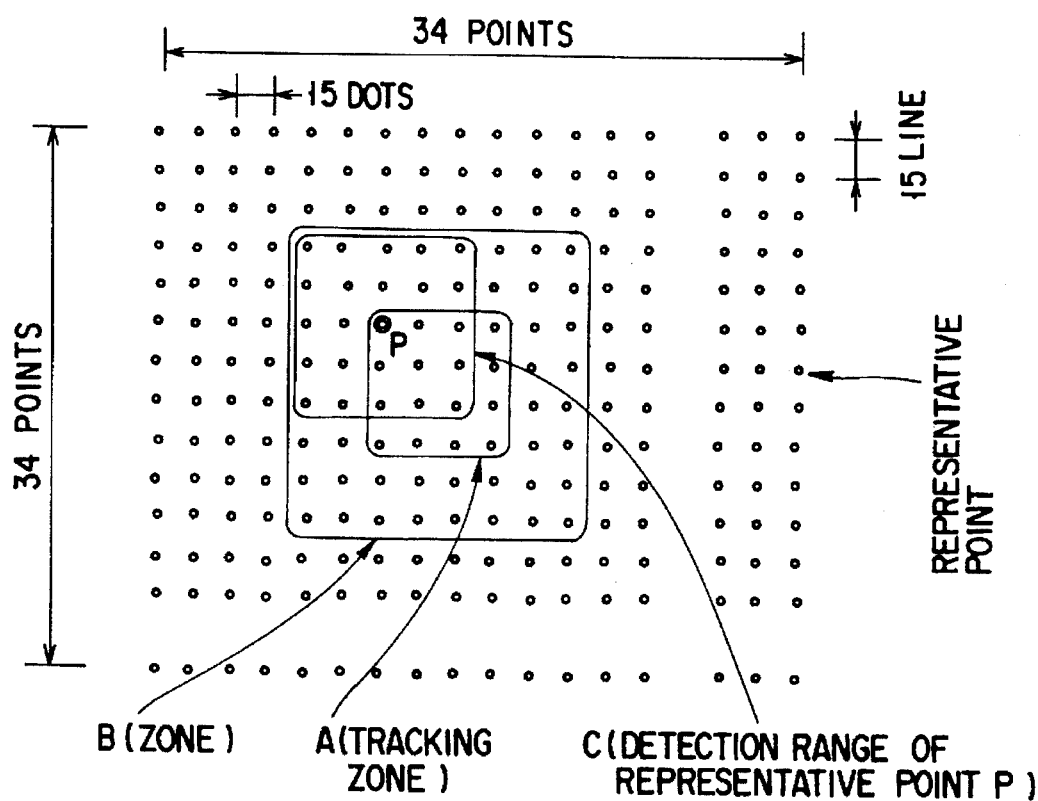
FIG. 11

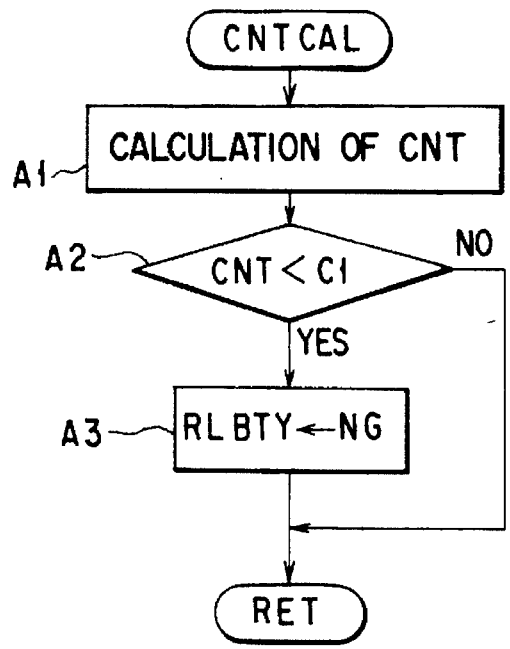
F I G. 13
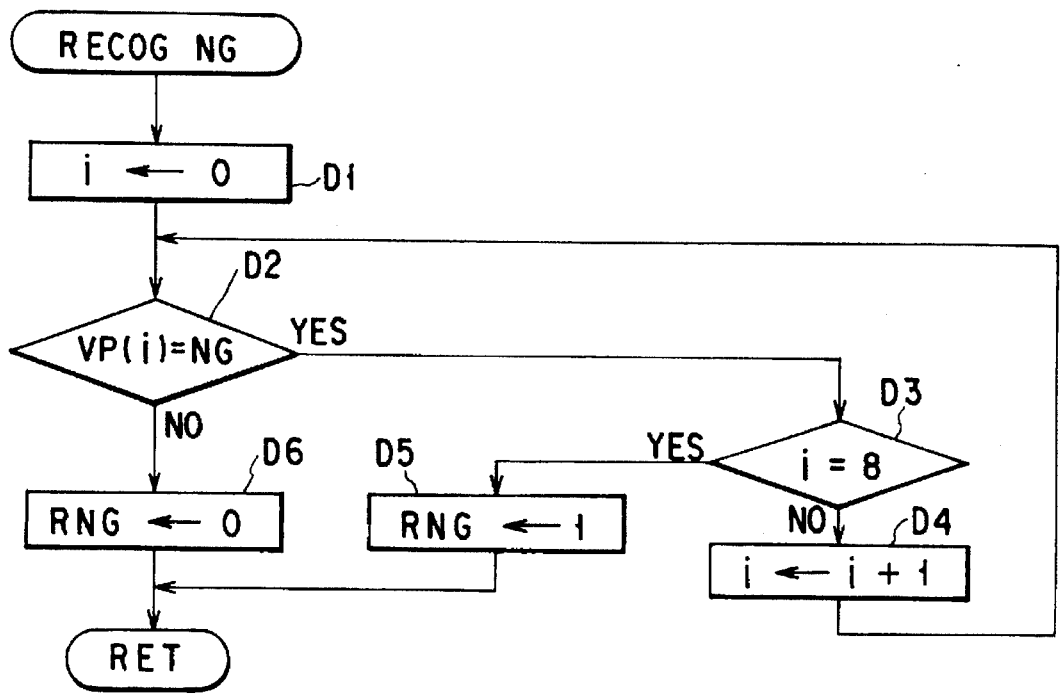
F I G. 16

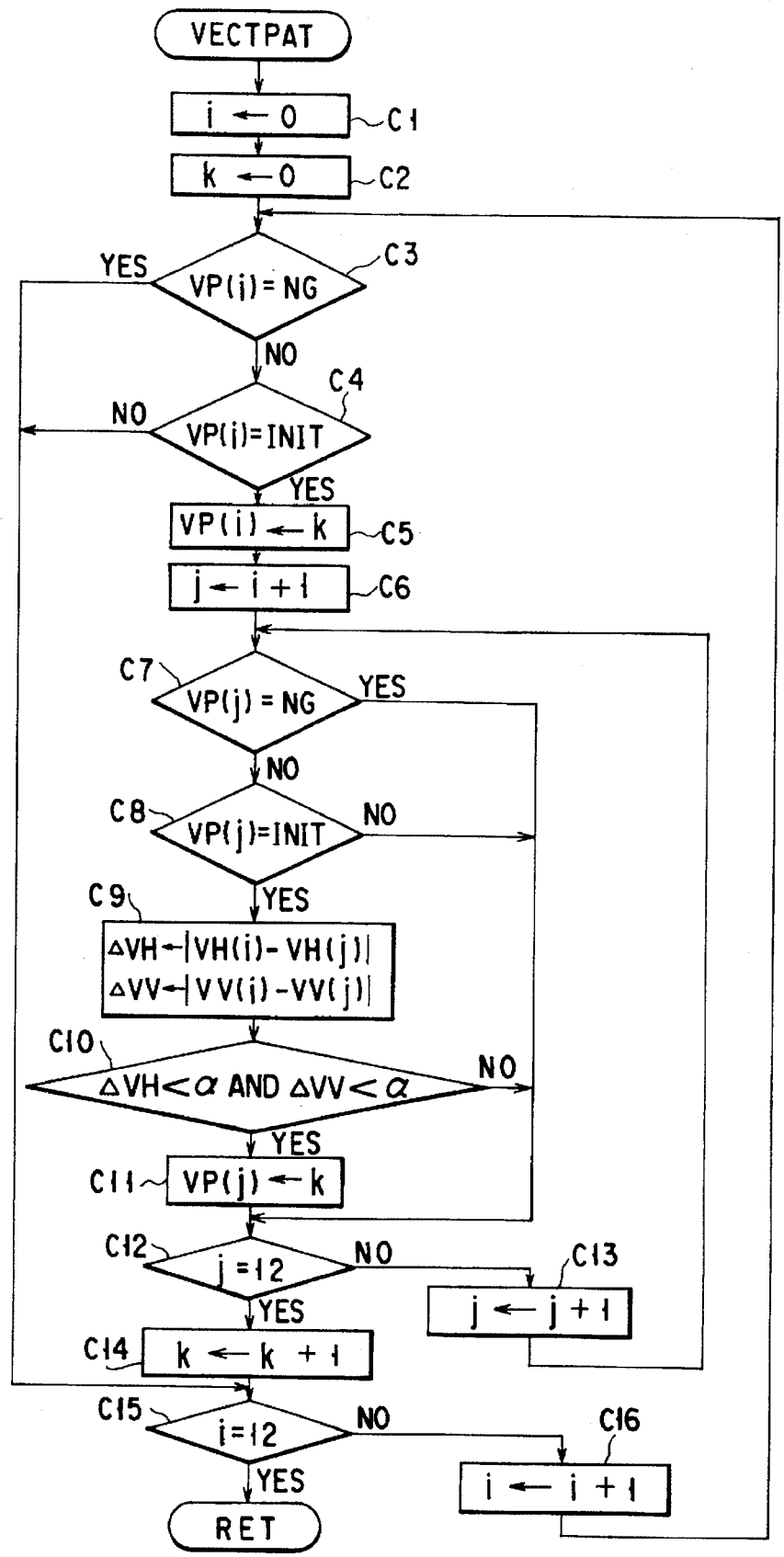
F I G. 15

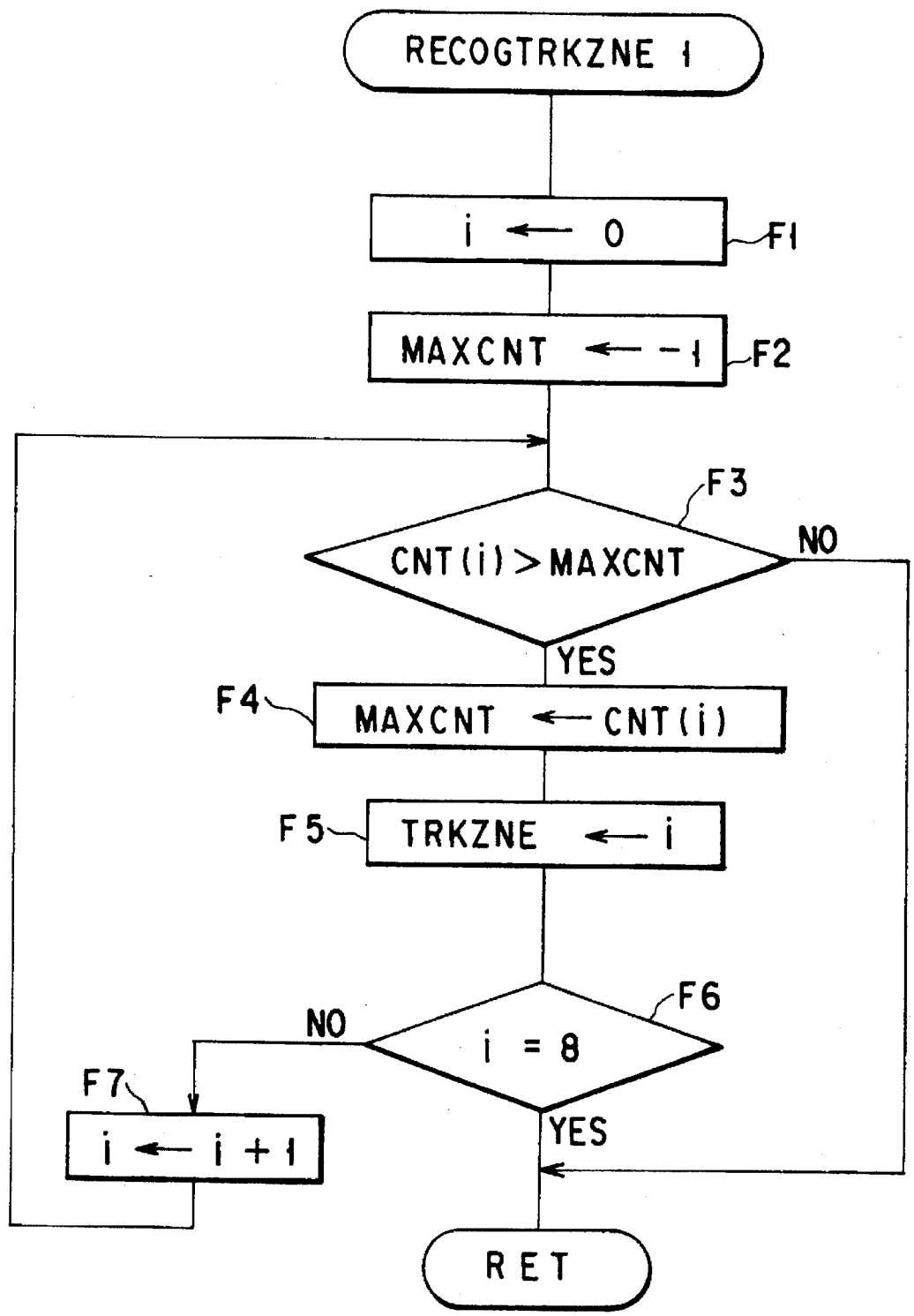
F I G. 18

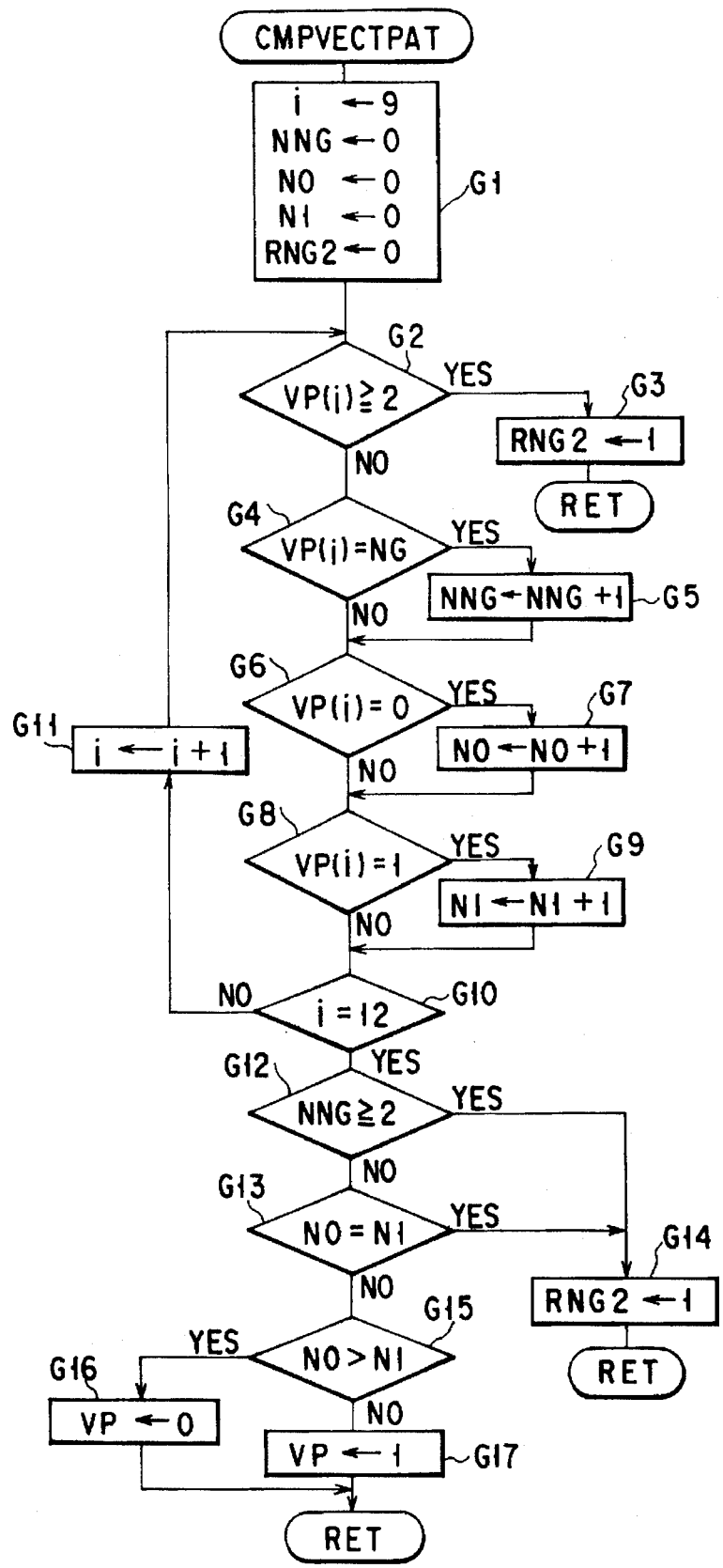
F I G. 19

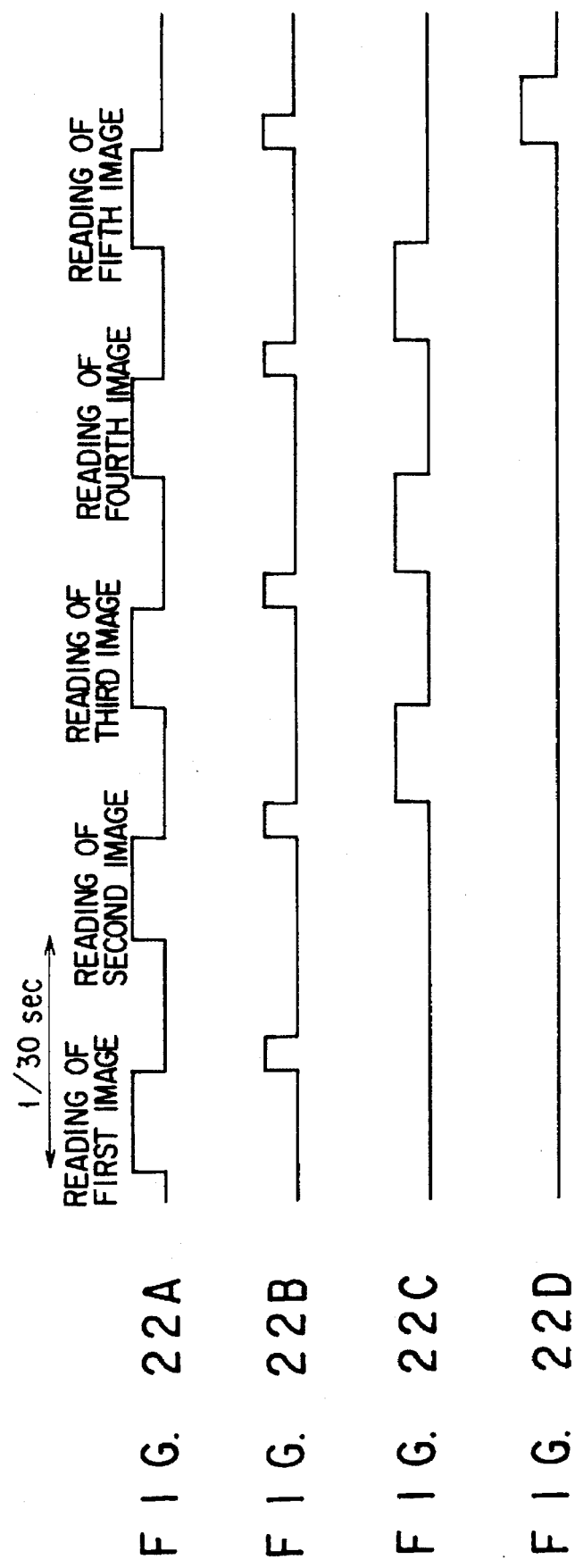

MOVING BODY DETECTION DEVICE OF CAMERA

BACKGROUND OF THE INVENTION

1. Field of the Invention

This invention relates to a moving body detection device, and more particularly to a moving body detection device of a camera for automatically determining a moving body and photographing the same or automatically tracking a moving body and photographing the same.

2. Description of the Related Art

Conventionally, various types of moving body detection cameras for dividing a relatively large range of an image of the camera into a plurality of areas and determining one of the areas in which a moving body lies are developed. Particularly, when a moving object is photographed, the operator manually and rapidly specifies a small area of the image of the camera to determine the area of the moving body. Further, some cameras detect the gazing point or the moving body by detecting the line of sight of the operator.

For example, according to Japanese Patent Application No. H.2-235074 (corresponding to Japanese Patent Disclosure No. 4-114135), the technique relating to a measuring range finder selection device is disclosed. In a camera including a means for dividing an image plane into a plurality of areas and selecting one of the areas, a focus frame display means for displaying the selected area, and a focusing means for setting the focus on an object lying in the focus frame, the focus frame is constructed by a focus frame selection means, a resistance comparing means and a means for moving the display of the focus frame to detect the direction in which a desired focus frame lies, move the focus frame in the detected direction and display the same.

Further, in the Japanese Patent Disclosure No. H.3-177828, the technique for improving the line-of-sight detecting operation of a line-of-sight detection device is disclosed.

Further, in the Japanese Patent Disclosure No. H.2-96707, the technique relating to an exposure controlling device having a network which is operated by learning to output a signal indicating the main portion of an object when the pattern of the object is input, for selecting a signal of the main portion of the object from outputs of a plurality of photoelectric conversion elements according to the output from the network and detecting the focus based on the selected signal is disclosed.

Further, in the Japanese Patent Publication No. S.59-32743, a correlation tracking device for tracking an object by use of the correlation process is disclosed.

However, when the operator manually selects a desired area from a large area of the image plane in the image of the camera by use of a joy stick or the like, it is extremely difficult to rapidly select the desired area for an object which rapidly moves, thereby requiring skill.

In the method of line-of-sight detection, it is difficult to accurately select a desired area of the image plane.

When the main object is automatically recognized from a large area of the image plane in the image of the camera by use of a neural network or the like, a large number of candidates of the main object may be present, making it difficult to recognize the main object.

Further, when a moving body is detected, a large field of view is first selected and then a specified object is selected from the selected field, but the moving object cannot be accurately traced in the prior art if the movement of the camera and the target moving object are not separated.

Further, in the device disclosed in the Japanese Patent Publication No. S.59-32743, the detection range of a motion vector, that is, the shift amount of correlation calculation is $0, 1, ---, N$ if the sampling time interval of two compared images is $\Delta T$ and kept constant. Since time for the calculation $\tau$ becomes longer as the shift amount N is set to a larger value, it is preferable to set the shift amount to a small value. However, if the shift amount N is set to a small value, the detection range of the shift amount becomes narrow. If $\Delta T$ is set short so as to make it possible to detect a rapidly moving object, it becomes impossible to detect a slowly moving object, and if $\Delta T$ is set long so as to make it possible to detect a slowly moving object, it becomes impossible to detect a rapidly moving object.

SUMMARY OF THE INVENTION

Accordingly, an object of this invention is to provide a moving body detection device of a camera capable of easily selecting a desired area from a wide area of the image plane of an image of the camera, detecting slowly and rapidly moving objects, and accurately detecting an area in which a desired object lies by simple operation even if the camera moves.

That is, the object of this invention is to provide a moving body detection device of a camera comprising:

video signal output means for outputting a video signal of an object;

input means for inputting the position of a gazing point;

storing means for storing a basic video signal corresponding to a moving body detection zone defined to include the position of the gazing point and obtained at a first timing and a reference video signal in the moving body detection zone obtained at a second timing;

first motion vector detection means for detecting the correlation between the reference video signal and the basic video signal corresponding to each of divided zones which are obtained by dividing the moving body detection zone for each divided zone and outputting motion vector information of each divided zone;

classifying means for classifying the motion vector for each divided zone;

second motion vector detection means for detecting a motion vector of a fixed moving body detection zone in the video signal of the object;

moving body detection means for detecting a divided zone including the motion vector of the object as a tracking zone by removing the motion vector of the camera itself detected by the second motion vector detection means from a plurality of motion vectors detected by the first motion vector detection means; and display means for displaying the tracking zone detected by the moving body detection means in a superposed state in a finder.

Another object of this invention is to provide a moving body detection device of a camera comprising:

light receiving means for converting an image of an object into an image signal;

input means for inputting the position of a gazing point;

first motion vector detection means for detecting a motion vector based on the calculation for correlation between the image signals in a preset area defined in association with the gazing point at first and second timings;

second motion vector detection means for detecting a motion vector based on the calculation for correlation between the image signals in a preset area previously defined irrespective of the gazing point at the first and second timings; and moving body detection means for detecting whether or not a moving body is present in an area containing the gazing point based on the first and second motion vectors.

Still another object of this invention is to provide a moving body detection device of a camera comprising:

video signal output means for outputting a video signal of an object;

input means for inputting the position of a gazing point;

motion vector detection means for detecting a motion vector based on the video signal for each of divided zones which are obtained by defining a moving body detection zone including the position of the gazing point and dividing the moving body detection zone; and moving body zone detection means for detecting a divided zone in which the moving body is present based on an output of the motion vector detection means.

Another object of this invention is to provide a moving body detection device of a camera comprising:

means for detecting the line of sight of a photographer who is looking into a view finder; means for detecting a gazing point in a photographing image according to an output from the line-of-sight detecting means;

means for setting a moving body detection area around the gazing point;

means for dividing the moving body detection area into a plurality of areas and calculating a motion vector for each area;

means for determining an area in which the moving body is present from the plurality of areas and setting a moving body tracking area by comparing the motion vectors of the respective areas; and means for effecting the moving body tracking operation in the moving body tracking area.

Still another object of this invention is to provide a moving body detection device of a camera comprising:

light receiving means for converting an image of an object into an image signal;

storing means for storing the image signal at a first timing as a basic image signal;

correlation calculating means for receiving the image signal at a second timing as a reference image signal and effecting the calculation of correlation between the basic image signal and the reference image signal;

correlation calculating means for receiving the image signal at a third timing when the amount of movement of the moving body is determined to be small based on the result of correlation calculation, updating the reference image signal by use of the received image signal, and causing the correlation calculating means to effect the calculation of correlation again; and moving body detection means for detecting a moving body based on an output of the correlation calculating means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is an external view showing the arrangement of a member for moving the mark of the gazing point;

FIG. 4 is a diagram showing the principle for detecting the direction of a line of sight and indicating a desired area in the image plane based on the detected direction

FIGS. 7A to 7D are diagrams showing examples of divisions of the moving body detection zone of FIG. 6 which is divided into a plurality of blocks FIG. 8 is a diagram showing the arrangement of 16 representative pixels in one of the tracking zones of FIGS. 7A–7D;

FIG. 9 is a diagram showing that one of the pixels in FIG. 8 is represented by the average value of five pixels;

FIGS. 10A and 10B are diagrams showing the principle of detection of the motion vector (the amount of movement and the direction);

FIG. 11 is a diagram showing the arrangement of representative points;

FIG. 13 shows a sub-routine of a program CNTCAL for effecting the contrast calculation for a basic image;

FIG. 15 shows a sub-routine of a pattern classifying program VECTPAT for the motion vector;

FIG. 16 shows a sub-routine of a program RECOGNG in which a variable RNG is set to 1 only when all of the vector patterns in the areas of the moving body detection zone are all NG;

FIG. 18 shows a sub-routine of a program RECOGTRKZNE1 for detecting a tracking zone of the maximum contrast from the moving body detection zone;

FIG. 19 shows a sub-routine of a program CMPVECT-PAT for deriving a vector pattern VP;

FIGS. 22A through 22D are timing charts for illustrating the schematic flow of control in one embodiment of this invention.

DETAILED DESCRIPTION OF THE PREFERRED EMBODIMENTS

There will now be described an embodiment of this invention with reference to the accompanying drawings.

Figure 1:
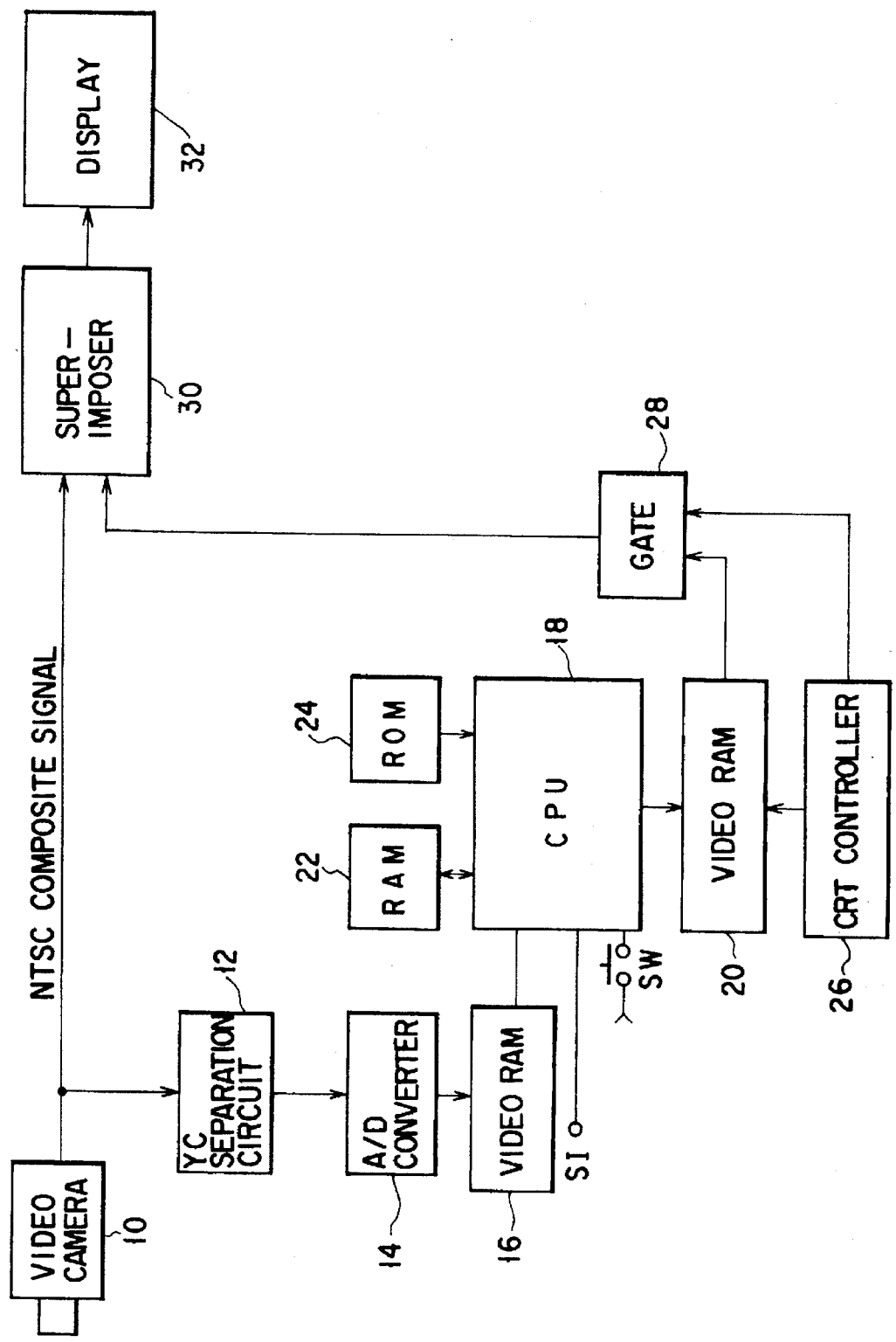
FIG. 1 is a block diagram showing the construction of a camera system to which a moving body detection device of a camera according to one embodiment of this invention is applied.

FIG. 1 is a block diagram showing the construction of a camera system to which a moving body detection device of a camera according to one embodiment of this invention is applied.

In FIG. 1, an NTSC composite signal output from a video camera 10 is supplied to a Y/C separation circuit 12 which separates the luminance signal of the composite signal and only the luminance signal is subjected to the A/D conversion in an A/D conversion circuit 14 and then input to a video RAM 16. A CPU 18 connects the video RAMs 16, 20, RAM 22 and ROM 24 to one another and effects the control and processing operations for the entire system.

The control procedure is previously programmed in the ROM 24. Further, the RAM 22 is used to store data obtained in the halfway of calculations and data obtained as the result of calculations. Further, the video RAM 20 is used to display the position of a gazing point derived by the CPU 18 and store display data of the tracking mark.

The display data stored in the video RAM 20 is supplied via a gate 28 at a timing defined by a CRT controller 26 and input to one of input terminals of a superimposer 30. The superimposer 30 serves to superimpose the tracking mark or the position of the gazing point which is an output of the gate 28 on the video signal from the video camera 10 and display the same. An output of the superimposer 30 is displayed on a display unit 32.

A signal s1 input to the CPU 18 is a signal used for permitting the operator of the camera to move the gazing point. A switch SW is used to hold the gazing point and start the tracking operation.

Figure 2A:
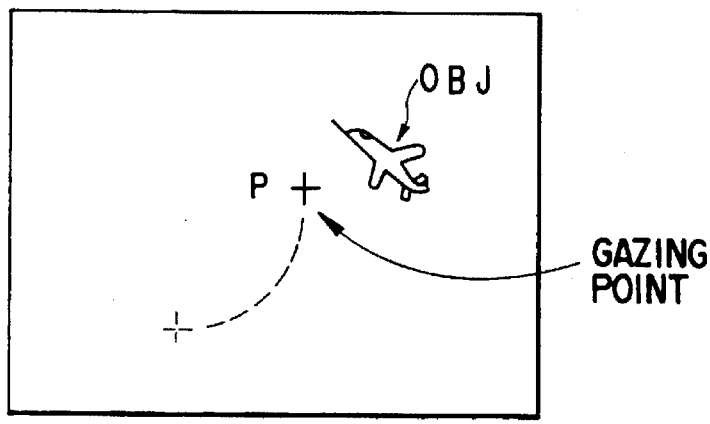
FIGS. 2A, 2B and 2C show examples of displays obtained after the operator of the camera has selected a gazing point until the tracking operation is effected, FIG. 2A being a diagram showing the state in which a gazing point mark P"+" is moved to a position near an object OJB by the operator, FIG. 2B being a diagram showing the state in which a moving body detection zone is superimposed with the "+" mark of FIG. 2A set at the center, and FIG. 2C being a diagram showing the state in which a tracking mark is superimposed on an area indicated by a tracking zone.
Figure 2B:
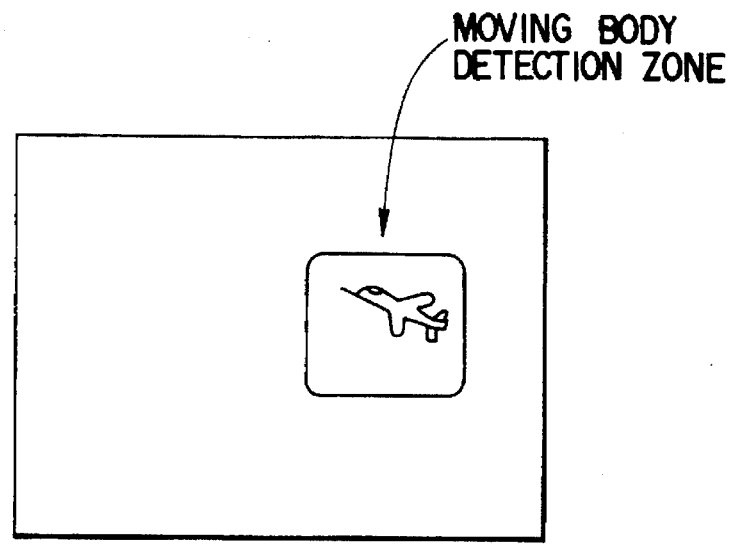
Figure 2C:
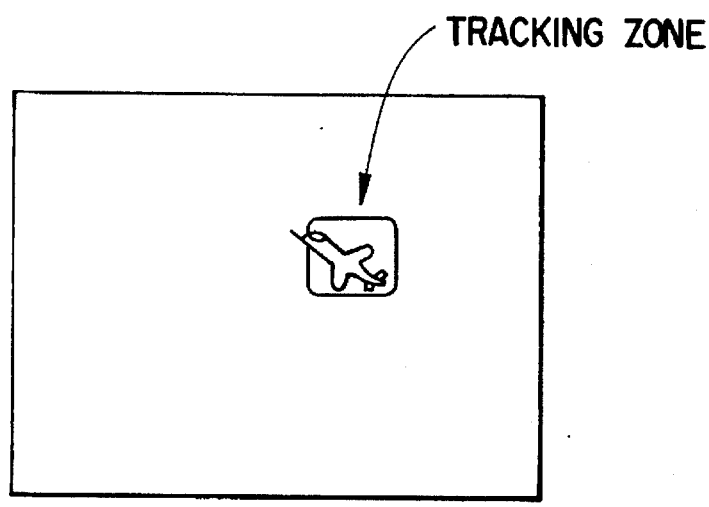

FIGS. 2A, 2B, 2C show examples of displays obtained after the operator of the camera has selected a gazing point until the tracking operation is effected. FIG. 2A is a diagram showing the state in which a gazing point mark P"+" is moved to a position near an object OJB by the operator. If the switch SW (refer to FIG. 1) is turned on, a moving body detection zone of large area is superimposed with the "+" mark of FIG. 2A set at the center as shown in FIG. 2B. Next, the moving body area is specified and the tracking operation is started by calculations as will be described later. The display of FIG. 2B may be omitted.

FIG. 2C shows the state in which a tracking mark is superimposed on an area indicated by a tracking zone as will be described later.

FIG. 3 shows the arrangement of a member for moving the mark ("+" shown in FIGS. 2A to 2C) of the gazing point. This is an example of application to a silver salt camera and is explained in detail in the Japanese Patent Application No. H.2-235074 filed by the same applicant of this application.

As shown in FIG. 3, a gazing point moving member 38 is mounted on a grip 36 of a camera body 34. A gazing point selection member 40 (corresponding to the superimposer 30 in FIG. 1) is mounted at the center of the gazing point moving member 38. The gazing point selection member 40 is also used as a release button.

Figure 5:
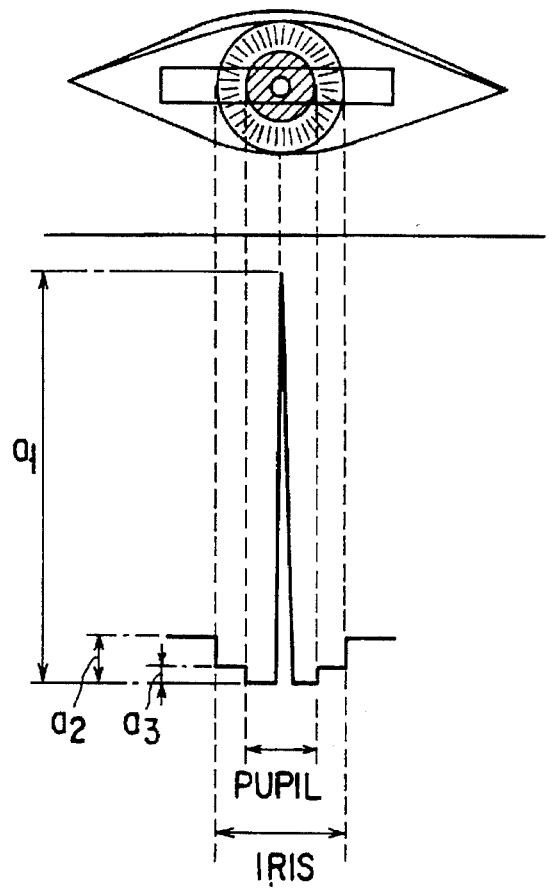
FIG. 5 is a diagram showing examples of an image reflected at the cornea of an eye, and waveforms of outputs from the pupil and iris.

FIGS. 4 and 5 are diagrams showing the principle for detecting the direction of a line of sight and indicating a desired area in the image plane based on the detected direction. The principles are described in detail in, for example, the Japanese Patent Disclosure No. H.2-5, Japanese Patent Disclosure No. H.2-65834, or Institute of Electronic and Communication Engineers of Technical Papers PRU88-73, pp17–24. The above techniques are used for detecting the direction of the line of sight according to a combination of the pupil of the eye and a reflected image at the cornea (first Purkinje image) or a combination of the iris and a reflected image at the cornea and have received much attention as a method for specifying the gazing point.

In FIG. 4, 42 denotes an infrared LED and parallel light fluxes are created by use of the infrared LED 42 via a lens 44. Further, in FIG. 4, 46 and 48 denote dichroic mirrors, 50 denotes an eye of the photographer, 52 denotes a CCD and 54 denotes a lens.

An infrared light emitted from the infrared LED 42 enters the eye 50 via the lens 44, dichroic mirrors 46, 48. A light reflected from the eye 50 is transmitted via the dichroic mirrors 48, 46 and lens 54 and photographed by the CCD 52, and then the direction of the line of sight is calculated based on the above-described principle. As a result, the position of a gazing point observed by the photographer can be detected by means of a photographing lens 56, mirror 58, mat 60, condenser lens 62, penta-prism 64 and dichroic mirror 48.

FIG. 5 is a diagram showing examples of an image reflected at the cornea of an eye, and waveforms of outputs from the pupil and iris.

Figure 6:
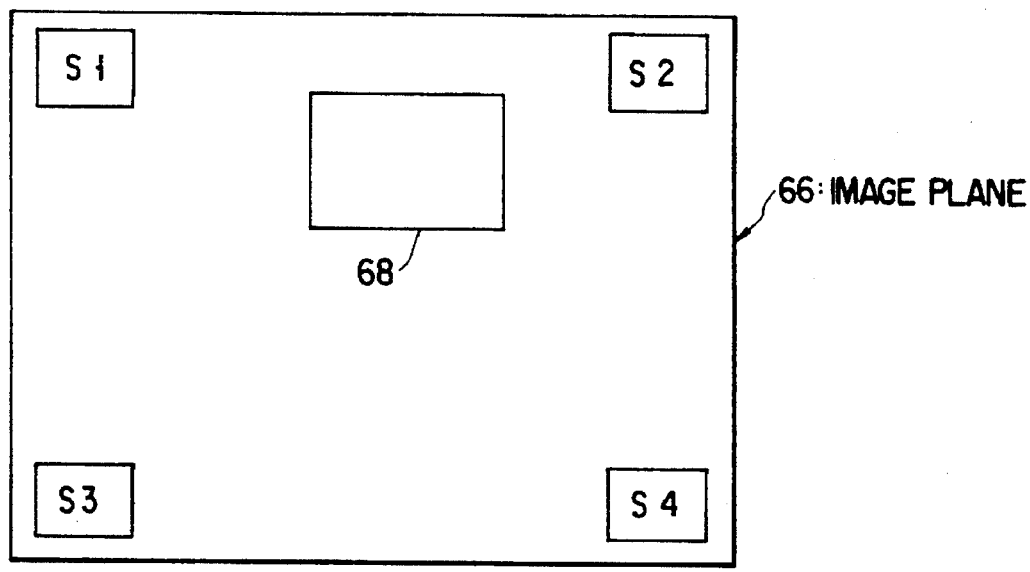
FIG. 6 is a diagram showing an example of a moving body detection zone and a motion detection area of the camera.

FIG. 6 is a diagram showing an example of a moving body detection zone and a motion detection area of the camera.

A moving body detection zone 68 in an image plane 66 is divided into a plurality of blocks as will be described later, and one of the divided blocks is selected and specified in a tracking zone. The block selection is effected by preferentially taking the moving body into consideration, and in this case, there occurs a problem that it becomes necessary to determine one of the camera and the object which is moving. In FIG. 6, areas indicated by S1 to S4 are motion vector detection areas set for determining the movement of the camera.

FIGS. 7A to 7D show examples of divisions of the moving body detection zone 68 of FIG. 6 which is divided into a plurality of blocks. As shown in FIGS. 7A through 7D, it is divided into nine blocks of tracking zones ($a_{11}$, $a_{12}$, $a_{13}$, $a_{21}$, $a_{22}$, $a_{23}$, $a_{31}$, $a_{32}$, $a_{33}$) to partly overlap each other and they are used to detect motion vectors in the respective areas.

As shown in FIG. 8, one tracking zone among the nine blocks of tracking zones is constructed by 16 representative pixels ($P_{(1,1)}$, $P_{(1,2)}$, - - - , $P_{(4,4)}$).

FIG. 9 is a diagram showing that one pixel $P_{(1,1)}$ shown in FIG. 8 is represented by the average value of five pixels $P_{(0)}$, $P_{(1)}$, $P_{(2)}$, $P_{(3)}$, $P_{(4)}$. The average value can be derived as follows.

$$P(1, 1) = \frac{\sum_{i=0}^{4} P(i)}{4} \quad (1)$$

FIGS. 10A and 10B are diagrams showing the principle of detection of the motion vector (the amount of movement and the direction) used in this invention (reference documents: Technical Papers of Television Institute Vol. 11, No. 3, pp 43–48, PPOE' 87-12 (May, 1987)).

Various methods have been provided as the motion vector detection method, the representative point matching described below is excellent from the viewpoint of the precision and speed. This is a method for picking up some pixels (which are hereinafter referred to as representative points) on the image plane and determining a motion vector according to a difference between positions thereof at a present timing and at a timing after a preset period of time.

Assume in the schematic diagram of FIG. 10 that the representative point P now lies in position shown in FIG. 10A. Then, after a preset period of time, a point which has a level nearest to that of the representative point P is derived by comparing the point P with points $p_1$ to $p_9$ shown in FIG. 10B. In this case, it is determined that the representative point has moved to the position of a pixel having the nearest level and a corresponding vector is determined as the motion vector. In practice, the number of representative points is increased to enhance the precision.

FIG. 11 shows an example of the arrangement of representative points. In FIG. 11, representative points are arranged on 34 points at an interval of 15 dots in a horizontal direction and arranged on 34 points at an interval of 15 lines in a vertical direction. As described before, the tracking zone is constructed by 4×4=16 representative points. The zone B (the motion vector detection range of the tracking zone A) is set to ±2 points in both of the vertical and horizontal directions.

That is, the detection range of the representative point P in FIG. 11 becomes 25 points in total. Further, as explained with reference to FIG. 9, the level of a pixel corresponding to each point has a low-pass filtering effect by deriving an average value of pixels on four surrounding points. As a result, an image of sharp edge can be obtained and the ability of detection of a thin line can be enhanced.

Next, the operation of the above embodiment is explained with reference to FIGS. 12 through 21.

Figure 12:
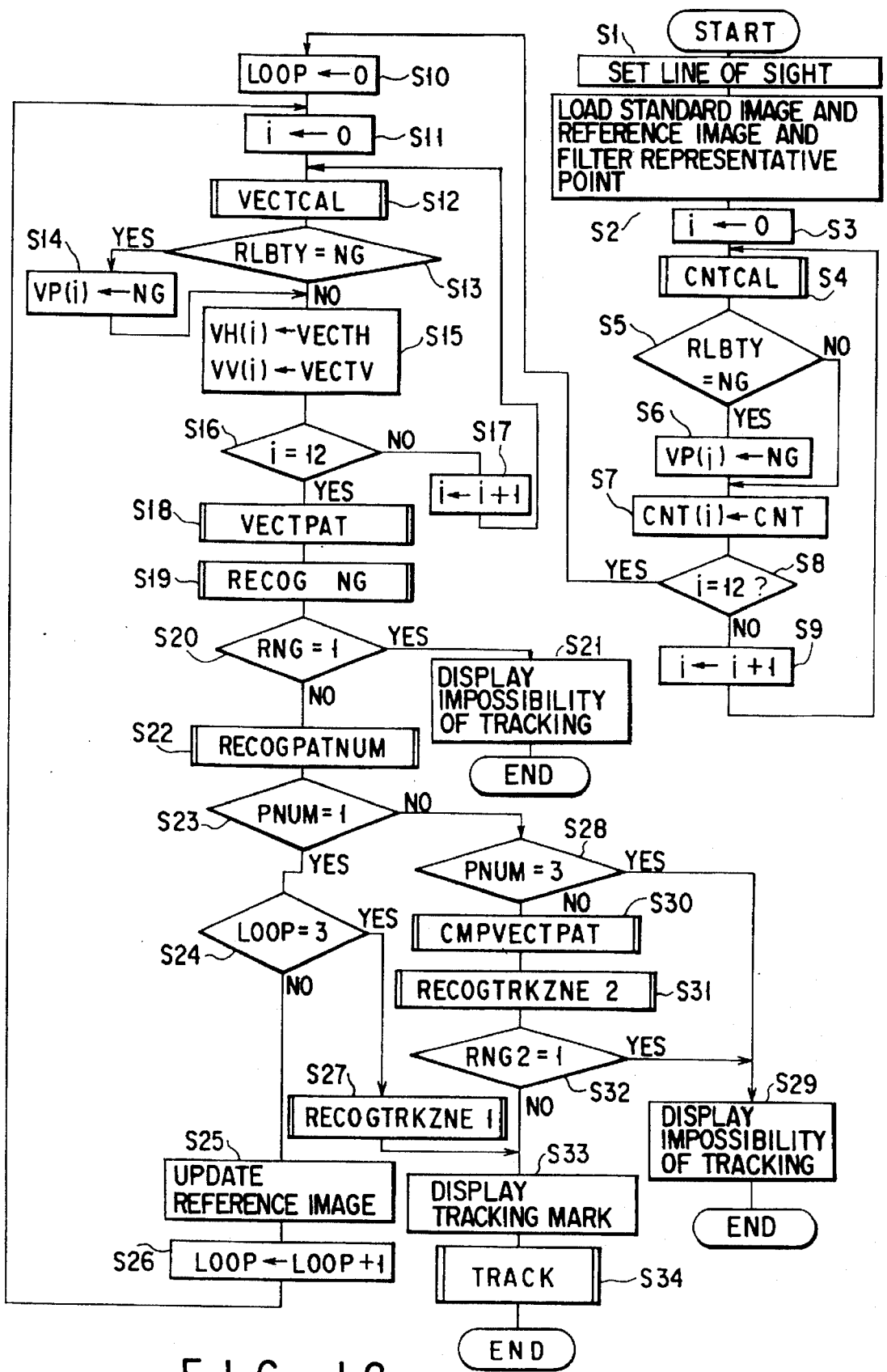
FIG. 12 is a flowchart for illustrating the control operation of the entire portion of the camera system.

FIG. 12 is a flowchart for illustrating the control operation of the entire portion of the camera system. In FIG. 12, the gazing point is first set (step S1). At this time, the CPU 18 reads the coordinate of the gazing point. Then, the levels of the representative points of the motion vector detection zone of the camera (refer to FIGS. 6 and 11) and the moving body detection zone at present are derived with the thus set gazing point set as the center (this is referred to as the load of the basic image and the representative point filtering). Next, after a preset period of time (1/30 sec.), the levels of the representative points in the same area as described before are derived in the same manner (this is referred to as the load of the reference image and the representative point filtering) (step S2).

The initialization is effected to set i to "0" (step S3). In this case, i is a variable indicating the areas of nine tracking zones (i=0 to 8) shown in FIGS. 7A–7D and the motion vector detection zone of the camera (i=9 to 12). Next, the contrast in the respective areas of i=0 to 12 is derived in the sub-routine CNTCAL (step S4). As shown in FIG. 8, each area is constructed by 16 representative points. Assume now that the representative points are $P_{(1,1)}, P_{(1,2)}, ---, P_{(4,4)}$ as shown in FIG. 8 and the output level of each representative point is expressed by the same symbol P(i,j).

FIG. 13 shows a sub-routine of a program CNTCAL for effecting the contrast calculation for a basic image. First, the calculation for contrast CNT is effected as follows (step A1). That is, assuming that the contrast in the X direction is CNTX, the contrast in the Y direction is CNTY, and the contrast is CNT, then the following equations (2), (3) and (4) can be obtained.

$$CNTX = \sum_{i=1}^{4} \sum_{j=0}^{3} |P(i,j) - P(i,j+1)| \quad (2)$$

$$CNTX = \sum_{i=0}^{3} \sum_{j=1}^{4} |P(i,j) - P(i+1,j)| \quad (3)$$

$$CNT(CNTX + CNTY)/2 \quad (4)$$

Next, CNT is compared with a preset level (step A2), and when the contrast of the image is insufficient, that is, when CNT<C1, it is determined that the result is not reliable and RLBTY is set to NG (step A3). After this, the process is returned from the sub-routine CNTCAL for the contrast calculation.

The process is returned to the flowchart of FIG. 12 and the value of the reliability variable RLBTY is checked (step S5), and when RLBTY=NG, a vector pattern VP(i) is set to NG (step S6). VP(i) is a variable used for classifying the types of motion vectors according to the pattern thereof and VP(i)=NG means that the motion vector cannot be detected.

Then, the variable CNT(i) is set to CNT (step S7) and i=12 is determined (step S8). If, at this time, i is not 12, 1 is added to i (step S9) and then the step S4 is effected. If i=12 is determined in the step S8, the contrast calculation is completed (steps S4 to S9).

Next, after 0 is set into a variable LOOP indicating the number of updating operations (step S10), 0 is set into the area selection i as the initial value again (step S11). If the CPU 18 selects a signal of a representative point in an area corresponding to i=0, the calculation for correlation between the basic image and reference image is effected in the sub-routine VECTCAL shown in FIG. 14 (step S12).

Figure 14:
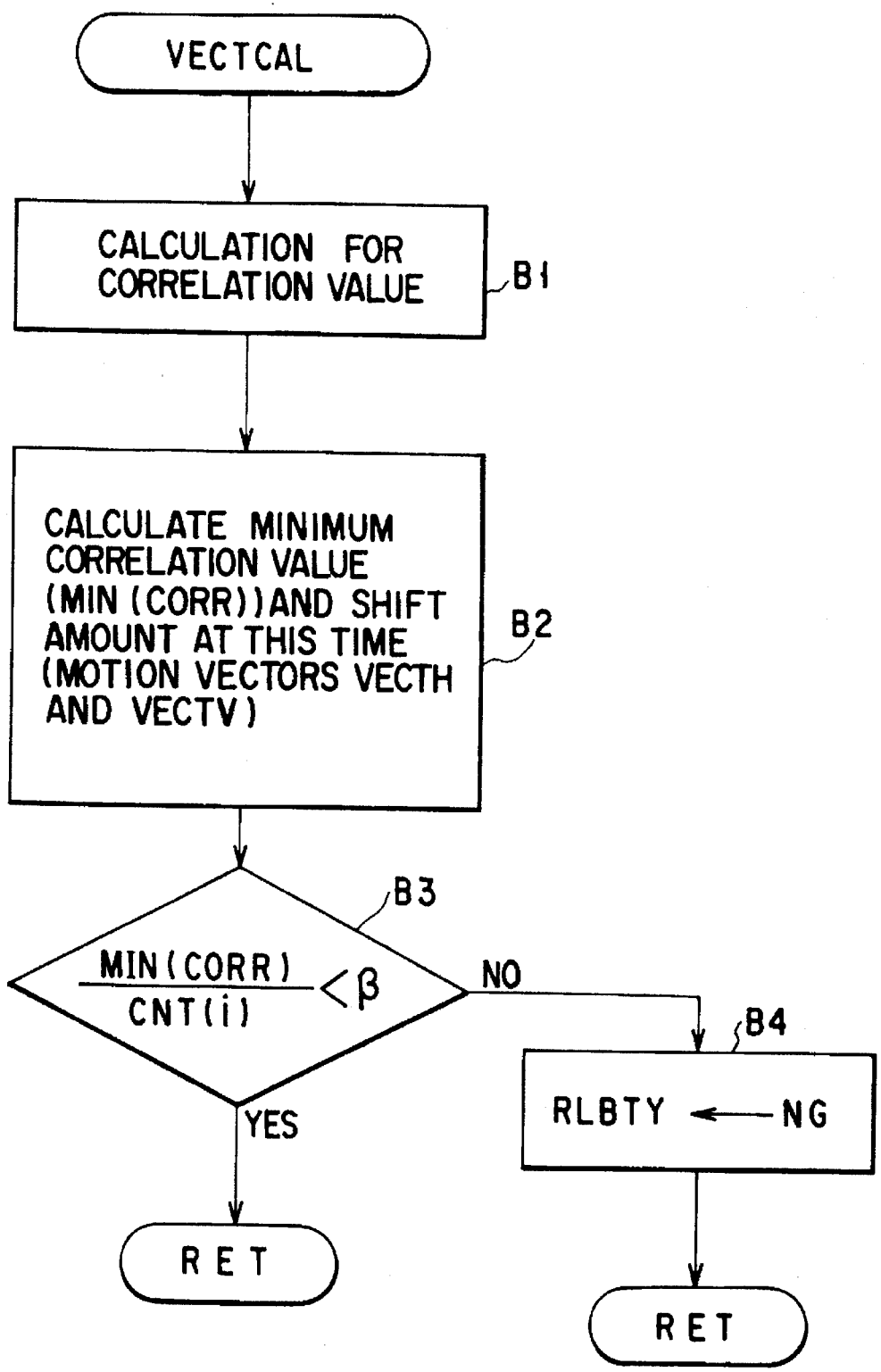
FIG. 14 shows a sub-routine of a program VECTCAL for effecting the calculation for correlation between the basic and reference images.

Assuming in FIG. 14 that a signal level corresponding to the position (refer to FIG. 8) of P(i,j) of the basic image is PS(i,j) and a signal level of the reference image is PR(i,j), then a correlation output CORR(S) can be expressed by the following equation (5) (step B1).

$$CORR(H, V) = \left| \sum_{i=1}^{4} \sum_{j=1}^{4} |PS(i,j) - PR(j+H, J+V)| \right| \quad (5)$$

where H=0, 1, 2, V=0, 1, 2, and V and H respectively indicate deviation amounts in the X and Y directions.

Next, the minimum value MIN(CORR(H, V)) of CORR (H, V) is derived. H and V obtained at this time are respectively set as the variables VECTH and VECTV. Then, as described before, MIN(CORR(H, V)) is divided by the contrast signal CNT(i) of the area i thus derived (step B2). When two images truly coincide with each other and the minimum value MIN(CORR(H, V)) is derived, MIN(CORR (H, V))/CNT(i) becomes smaller than a preset value β and it is experimentally confirmed that the reliability is lowered as the result of division becomes larger.

It is checked whether or not MIN(CORR(H, V))/CNT(i) <β (step B3), and when MIN(CORR(H, V))/CNT(i) is not smaller than β, it is determined that the reliability is insufficient and the variable RLBTY is set to NG (step B4).

Thus, the process is returned from the sub-routine VECTCAL to the step S13 shown in FIG. 12. If it is determined in this step that RLBTY=NG, the vector pattern VP(i) is set to NG (step S14).

Next, the horizontal motion vector VECTH and vertical motion vector VECTV are respectively set as the variables VH(i) and vv(i) (step S15). After this, for all of the areas i=0 to 12, it is checked whether the above calculations of motion vector are completed or not (step S16). If the calculation is not completed, 1 is added to i until i becomes 12 (step S17) and the process is returned to the step S12. If it is determined in the step S16 that i=12, the sub-routine VECTPAT for classifying the motion vectors (VH(i), VV(i)) of the respective areas i=0 to 12 is effected (step S18).

FIG. 15 shows a sub-routine of a pattern classifying program VECTPAT for the motion vector. In FIG. 15, the variable i for selecting an area (step C1) is set to 0 and the variable k indicating the number of a vector pattern is set to 0 (step C2). Then, it is checked whether the vector pattern VP(i) is NG or not (step C3), and if it is not NG, it is checked whether or not VP(i) is a constant INIT which cannot be the true type of motion vector obtained by the pattern classification (step C4).

INIT is a value initially set immediately after the flowchart of FIG. 12 is started although not shown in the main program. More specifically, INIT may be a value other than 0 to 12. If VP(i)=INIT, the value of k is set as VP(i) (step C5). Next, (i+1) is substituted for the variable j (step C6), and when vp(j) is not NG (step C7) and VP(j)=INIT (step C8), differences in motion vector |VH(i)–VH(j)| and |VV(i)–VV(j)| are derived and respectively substituted for $\Delta VH$ and $\Delta VV$ (step C9).

When $\Delta VH<\alpha$ and $\Delta VV<\alpha$ (step C10), it is determined that the vector (VH(i), VV(i)) and the vector (VH(j), VV(j)) are the same vector and VP(j) is set to k (step C11). Then, it is checked whether j=12 or not (step C12), and if j is not 12, (j+1) is substituted for j (step C13) and then the process is returned to the step C7 to effect the same calculations.

When the result of determination in the step C7 is "YES", the result of determination in the step C8 is "NO", and the result of determination in the step C10 is "NO", it is checked whether j=12 or not, and if j is not 12, (j+1) is substituted for j and then the same calculations are effected.

If it is detected in the step C12 that j=12, (k+1) is substituted for the variable k representing the type of the vector pattern (step C14). If i=12 (step C15), the process is returned from this subroutine. If it is determined in the step C15 that i is not 12, (i+1) is substituted for the variable i (step C16) the process is returned to the step C3 and the above loop is repeatedly effected.

The table 1 indicates the concrete example of the calculation effected in the above loop.

TABLE 1

| i | (VH(i), VV(i)) | VP(i) |
|---|---|---|
| 0 | (1, 1) | 0 |
| 1 |  | NG |
| 2 | (0, 0) | 1 |
| 3 | (1, 1) | 0 |
| 4 | (0, 0) | 1 |
| 5 | (0, 0) | 1 |
| 6 | (1, 1) | 0 |
| 7 | (0, 0) | 1 |
| 8 |  | NG |
| 9 |  | NG |
| 10 | (1, 1) | 0 |
| 11 | (1, 1) | 0 |
| 12 | (1, 1) | 0 |

As shown in the above example, if the vectors (VH(i), VV(i)) are coincide with one another within a preset error, the same number is given to the vector patterns VP(i). Each time the vector pattern is changed, numerals of 0, 1, 2, - - - are sequentially given. VP(i)=NG is kept unchanged.

When the process in the sub-routine VECTPAT is ended (step S18), the sub-routine RECOGNG shown in FIG. 16 is effected (step S19). In this sub-routine, the variable i is set to 0 (step D1), and if VP(i)=NG (step D2), it is checked whether i=8 or not (step D3). If i is not 8, (i+1) is substituted for i (step D4) and the process is returned to the step D2.

If it is detected in the step D3 that i=8, the variable RNG is set to 1 (step D5). Further, if it is detected in the step D2 that VP(i) is not NG, the variable RNG is set to 0 (step D6).

That is, the sub-routine is a program for setting the variable RNG to 1 only when all of the patterns in the areas of the moving body detection zone (i=0 to 8) are NG.

The process is returned to the flowchart of FIG. 12, and when it is detected in the step S20 that RNG=1, the impossibility of tracking is displayed (step S21). On the other hand, when it is detected in the step S20 that RNG is not 1, the sub-routine RECOGPATNUM is effected (step S22).

Figure 17:
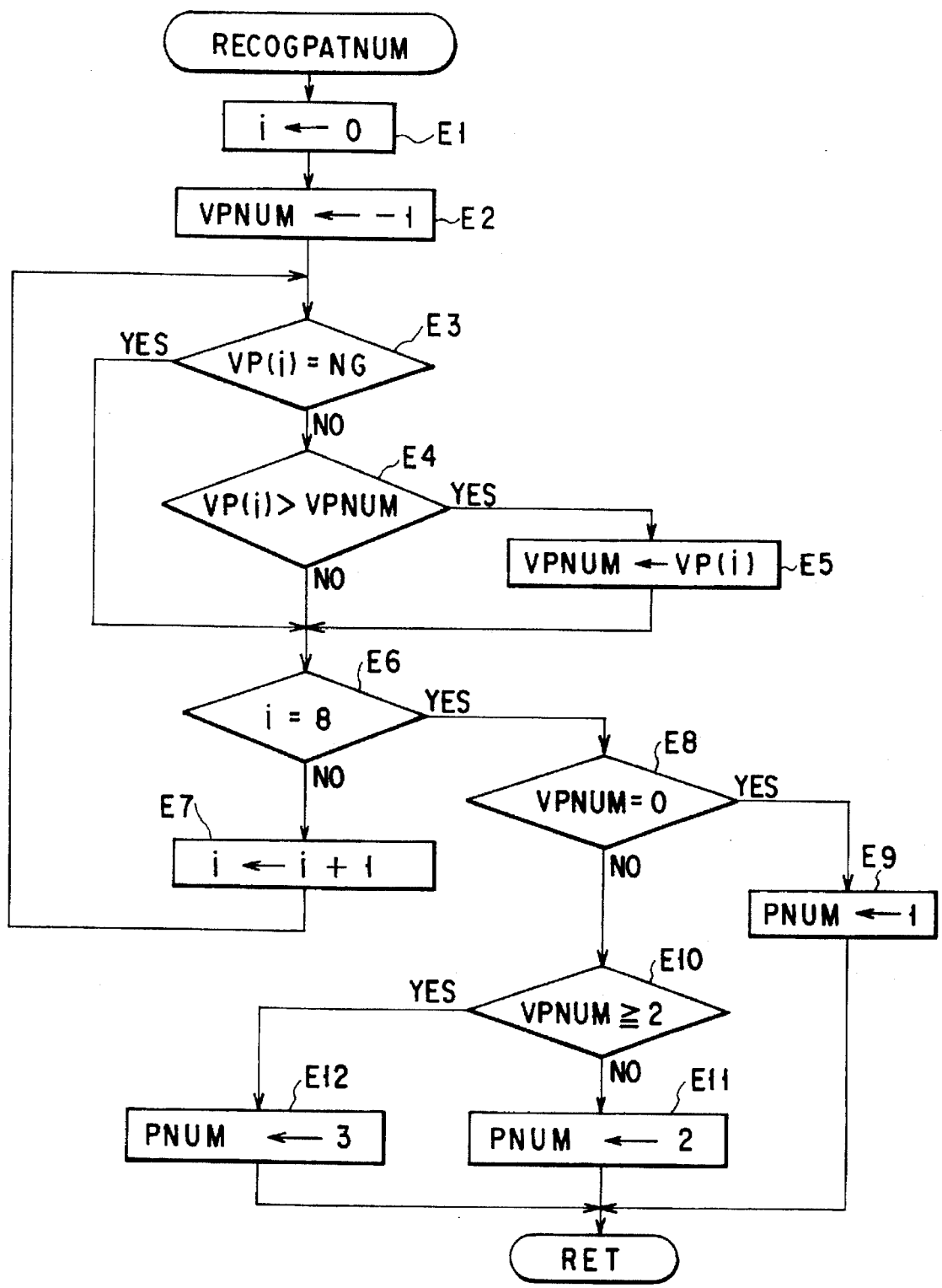
FIG. 17 shows a sub-routine of a program RECOGPATNUM for deriving the number (type) of vector patterns in the areas of the moving body detection zone.

As shown in FIG. 17, this program is a sub-routine for deriving the number (type) of vector patterns of the areas in the moving body detection zone (i=0 to 8). Since the vector patterns VP(i) are classified starting from 0 in the sub-routine VECTPAT, the maximum value of VP(i) is derived and the sum of the maximum value and 1 becomes equal to the number of vector patterns.

First, the variable i representing the moving body detection zone is set to 0 (step E1). Then, the variable VPNUM is set to –1 (step E2). Next, if it is checked whether VP(i)=NG or not (step E3), and if it is detected that VP(i) is not NG, VP(i) is compared with VPNUM (step E4). If VP(i)>VPNUM, VP(i) is substituted for VPNUM (step E5).

Next, the value of the variable i is checked (step E6), and if it is detected that i is not 8, (i+1) is substituted for i (step E7), the process is returned to the step E3 and then the above operation is repeatedly effected. If it is detected in the step E3 that VP(i)=NG, the step E6 is effected. As the result of the above process, the maximum value of VP(i) (i=0 to 8) is substituted for VPNUM.

After this, the value of VPNUM is checked (step ES), and if VPNUM=0, it is determined that the vector pattern number is one and the variable PNUM representing the vector pattern number is set to 1 (step E9). If it is determined in the step E8 that VPNUM is not 0 and VPNUM is smaller than 2 (step E10), PNUM is set to 2 (step S11). Further, if it is determined in the step E10 that VPNUM≧2, PNUM is set to 3 (step S12). After this, the process is returned from this sub-routine.

The process is returned to the flowchart of FIG. 12 again, and if it is detected in the step S23 that the vector pattern number PNUM=1, the motion vector of the body lying in the moving body detection zone is one type.

The possibility of motion of the body in the moving body detection zone considered in this case is as follows.

(i) Bodies are moving together in one direction in the moving body detection zone (ii) The body is not moving;

(iii) The body is not moving, but the camera is moving; and (iv) Part of the moving body detection zone is moving, but the movement is slow and cannot be detected.

In this embodiment, in the cases of (i) to (iii), one of the nine areas shown in FIGS. 7A to 7D which has the maximum contrast is determined as a tracking zone or distance measuring zone. In the case of (iv), the motion vector is detected again by updating the reference image while keeping the basic image unchanged. The number of updating operations is determined by the variable LOOP.

Next, it is checked whether LOOP=3 or not (step S24). If, in this case, it is detected that LOOP is not 3, the reference image is updated (step S25), and after (LOOP+1) is substituted for the variable LOOP (step S26), the process is returned to the step S11. On the other hand, in a case where the vector pattern number PNUM=1 even if it is detected in the step S24 that LOOP=3, the sub-routine RECOGTRKZNE1 is effected as shown in FIG. 18.

The sub-routine is a program for detecting a tracking zone with the maximum contrast from the moving body detection zone. In FIG. 18, the variable i indicating the area is set to 0 (step F1). Then, the variable MAXCNT is set to −1 (step F2). Next, the contrast values CNT(i) of the respective areas of the moving body detection zone (i=0 to 8) are compared with MAXCNT (step F3).

In the step F3, if it is detected that CNT(i)>MAXCNT, CNT(i) is substituted for MAXCNT (step F4). Then, finally determined i is set as TRKZNE (step S5). Thus, (i+1) is substituted for the variable i (step F7) and the steps F3 to F7 are repeatedly effected until i becomes 8 and the process is returned from this sub-routine (step F6).

In the flowchart of FIG. 12, the tracking mark is superimposed on the area represented by TRKZNE (state shown in FIG. 2C)(step S33). Then, the tracking process is effected by use of the sub-routine TRACK (step S34).

If it is detected in the step S23 that the vector pattern number PNUM is not 1, it is checked whether PNUM=3 or not (step S28). If PNUM=3, bodies which move in different manners are present so that the impossibility of the tracking is displayed (step S29).

If it is detected in the step S28 that PNUM is not 3, PNUM is automatically set to 2. At this time, there is a high possibility that one of the vector movements is the movement of the camera. At this time, by comparing the motion vector with motion vectors in four motion vector detection areas S1 to S4 (refer to FIG. 6) (i=9 to 12) fixedly arranged in four corners of the image plane different from the moving body detection zone, an area in which the body is actually moving is specified from the two motion vectors in the moving body detection zone.

The sub-routine CMPVECTPAT (step S30) is based on the following assumptions.

(a) It is determined impossible to effect the tracking operation when a motion vector Vp(i) different from the moving body detection zone is observed in the four areas (i=9 to 12) different from the moving body detection zone;

(b) It is determined impossible to effect the tracking operation when two or more areas in which VP(i)=NG (detection is impossible) are present; and (c) It is determined impossible to effect the tracking operation when two types of motion vectors are present in VP(i) (i=9 to 12) and the numbers of areas in which the vector patterns are present are the same (for example 2:2 or 1:1).

Next, a sub-routine of a program CMPVECTPAT of FIG. 19 is explained. In FIG. 19, the variable i indicating the area is set to 9 and the variables NNG, N0, N1, RNG2 are set to 0 (step G1). In this case, it should be noted that the maximum value of the vector pattern VP(i) of i=0 to 8 is 1.

Next, it is checked whether VP(i)≧2 or not (step G2), and if it is detected that VP(i)≧2, a flag RNG2 for display of the impossibility of tracking is set to "1" for the reason of (a) (step G3) and the process is returned. If VP(i) is smaller than 2 and VP(i)=NG (step G4), a counter variable NNG for NG is incremented (step G5).

Next, it is checked whether VP(i)=0 or not (step G6), and if it is detected that VP(i)=0, N0 is incremented (step G7). In a case where VP(i)=1 (step G8), N1 is incremented (step G9).

The above operation is repeatedly effected until i becomes 12 (steps G10, G11).

Thus, the vector pattern number which causes VP(i)=NG is set to NNG, the vector pattern number which causes VP(i)=0 is set to N0, and the vector pattern number which causes VP(i)=1 is set to N1.

When it is detected in the step G10 that i=12, and if NNG≧2 (step G12), the flag RNG2 for display of the impossibility of tracking is set to "1" for the reason of (b) (step G14). Further, when N0=N1 (step G13), the flag RNG2 for display of the impossibility of tracking is set to "1" for the reason of (c).

After this, it is checked whether N0>N1 or not (step G15), and if it is detected that N0>N1, the variable VP is set to 0 (step G16) and when N0≦N1, VP is set to 1 (step G17) and the process is returned.

The process is returned to the flowchart of FIG. 12, and when the sub-routine CMPVECTPAT of the step S30 is completed, the sub-routine RECOGTRKZNE2 is effected (step S31). This is a program for detecting an area in which the moving body is present from the moving body detection zone based on the value of VP derived in the sub-routine CMPVECTPAT.

VP obtained in the sub-routine CMPVECTPAT of the step S30 is a vector pattern which is one of those vector patterns of one of two types (0 or 1) of the areas i=9 to 12 which are larger in number than vector patterns of the other type and the vector pattern is determined to be the motion vector of the camera. Therefore, the tracking zone having the motion vector which is not equal to VP and included in the two types of motion vectors in the moving body detection zone is the area in which the moving body is present. Further, when a plurality of areas in the moving body are detected, one of the areas which has the highest contrast is regarded as the tracking zone.

Figure 20:
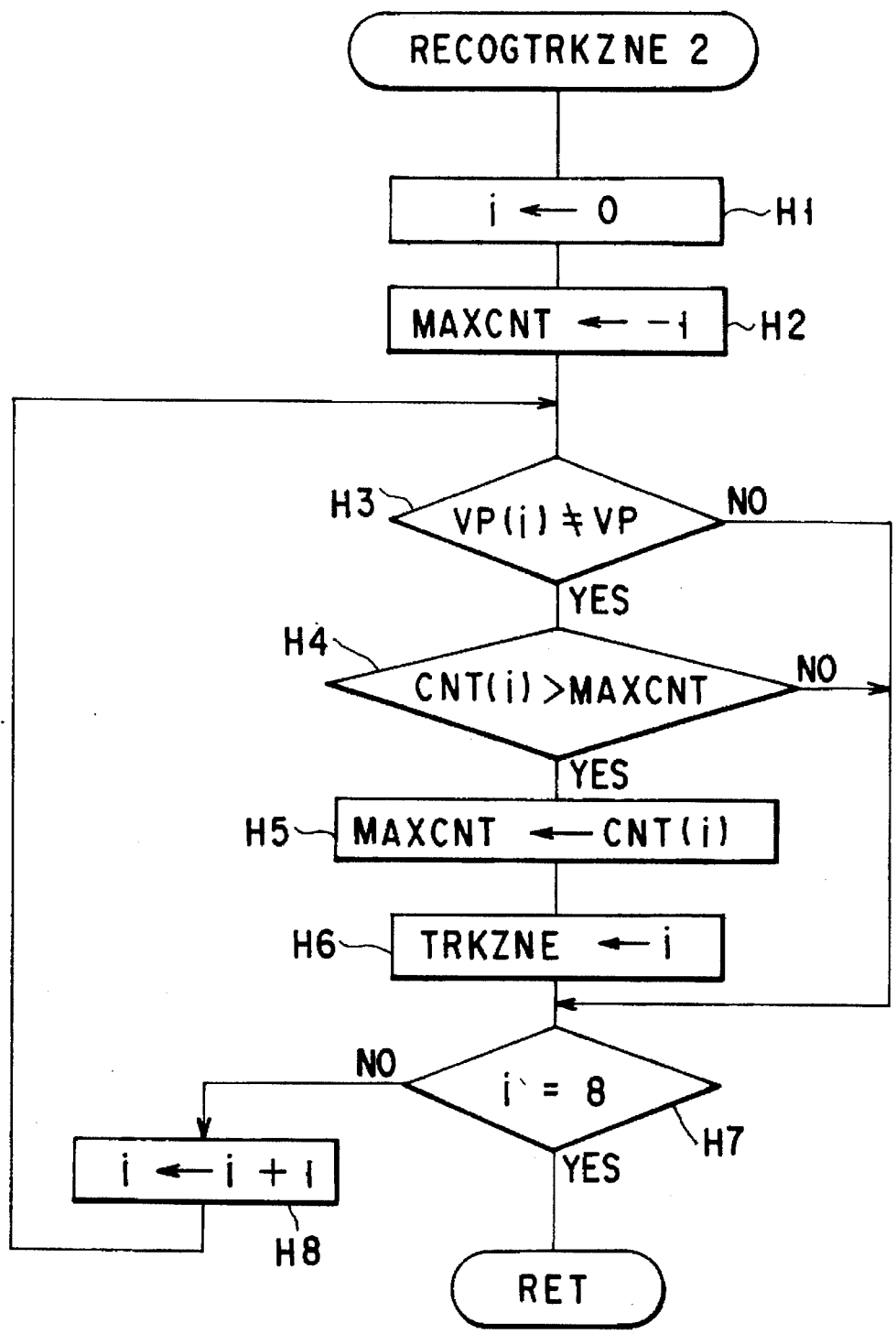
FIG. 20 shows a sub-routine of a program RECOGTRKZNE2 for detecting an area in which the moving body is present from the moving body detection zone based on the value of VP derived by the sub-routine CMPVECT-PAT.

FIG. 20 shows a program for detecting an area having the highest contrast. First, i is set to 0 (step H1). Then, MAXCNT is set to −1 (step H2) and it is checked whether VP(i)=VP or not (step H3).

If it is detected in the step H3 that VP(i) is not VP, the contrast CNT(i) is compared with MAXCNT (step H4) and when CNT(i)>MAXCNT, then CNT(i) is substituted for MAXCNT (step H5). After this, i is set as TRKZNE (step H6).

Next, it is checked whether i=8 or not (step H7). If i is not 8, i is incremented (step H8) and the above operation is repeated. Thus, the tracking zone i is finally set as the variable TRKZNE.

The process is returned to the flowchart of FIG. 12, and when it is detected in the step S32 that RNG2=1, the impossibility of tracking is displayed, and when RNG2 is not 1, the tracking mark is displayed (step S33) and then the sub-routine for the tracking calculation TRACK is effected (step S34).

Figure 21:
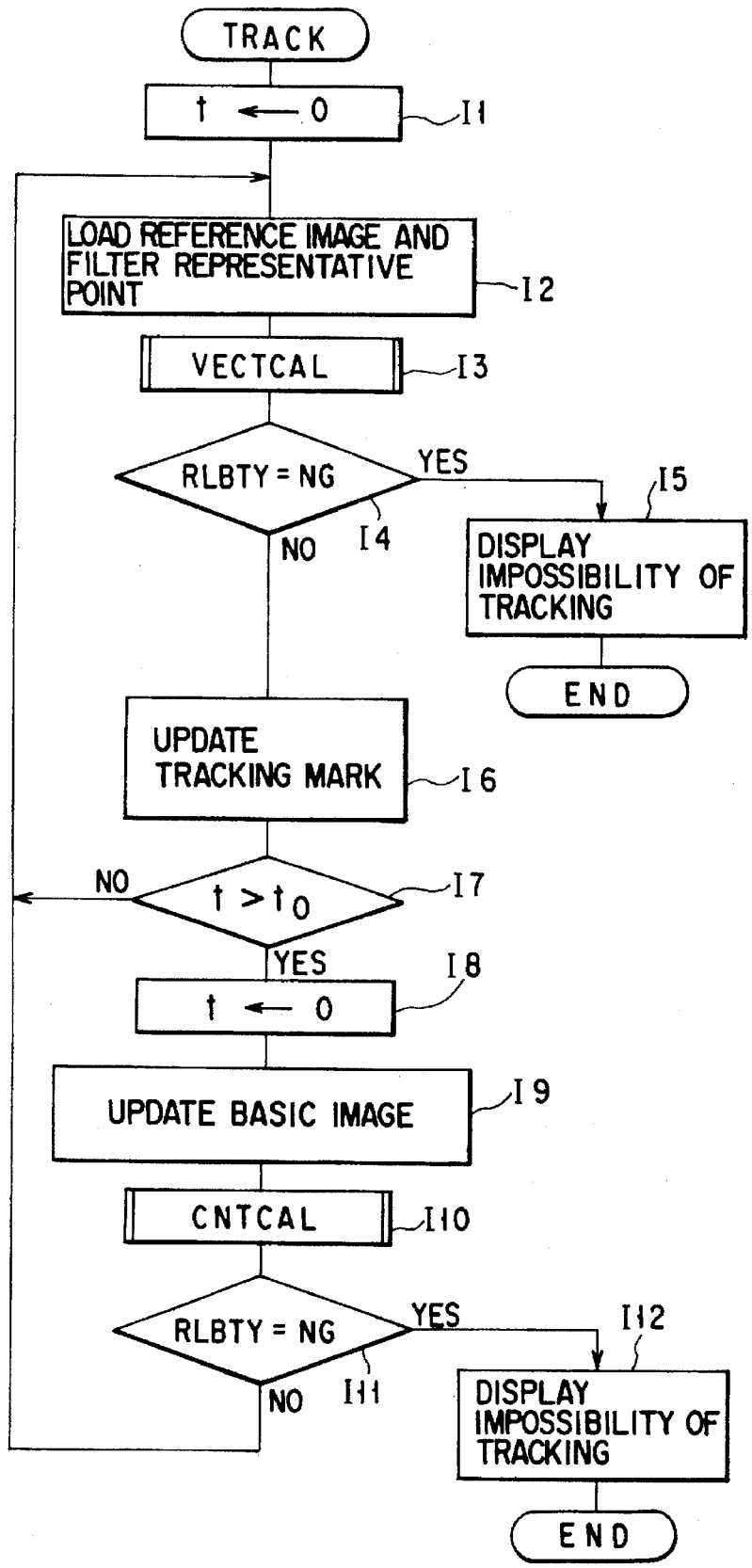
FIG. 21 shows a sub-routine of a program TRACK for tracking calculation.

FIG. 21 shows the sub-routine TRACK. In FIG. 21, 0 is set into timer t (step I1). Then, the load of the reference image and representative point filtering process are effected (step I2). After this, a motion vector subjected to the sub-routine VECTCAL is derived (step I3).

At this time, it is checked whether the reliability variable RLBTY=NG or not (step I4). If it is detected in the step I4 that RLBTY=NG, the impossibility of tracking is displayed (step I5). On the other hand, when RLBTY is not NG, the operation of updating the tracking mark is effected according to the value of the motion vector (step I6).

Next, it is checked whether the timer t>$t_0$ ($t_0$ is one second, for example) or not (step I7), and when t>$t_0$, t is set to 0 (step I8) and the basic image is updated (step I9). Next, the contrast calculation is effected (step I10), and if the contrast is insufficient and RLBTY=NG (step I11), the impossibility of tracking is displayed (step I12). On the other hand, if it is detected in the step I11 that RLBTY is not NG, the calculation for correlation between the basic image and the reference image is effected to effect the tracking operation.

As described above, the basic image is updated for each preset period of time and a body whose shape is gradually changed during the movement can be tracked.

FIGS. 22A through 22D are timing charts for illustrating the schematic flow of control in the above embodiment of this invention. FIG. 22A shows the timings of reading out an image for every 1/30 second. FIG. 22B shows the timings of effecting the filtering of the motion vector detection zone of the camera and the moving body detection zone and the contrast calculation. FIG. 22C shows the timings of calculation for the motion vector. FIG. 22D shows the timings of tracking operation.

First, a motion vector is detected by comparing the second image with the first image shown in FIG. 22A with the first image used as a basic image. In this case, if the motion vector can be detected, a motion vector is detected based on the first and third images with the basic image kept unchanged. FIG. 22A shows a case wherein a motion vector is finally determined based on the first and fourth images. In this way, the fifth and succeeding images are tracked.

The above embodiment is applied to the moving body tracking system, but this invention can be applied to a silver salt camera for photographing immediately after a gazing point is selected.

Further, this invention can be applied to a device for simultaneously effecting the tracking operation and automatic focusing operation.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A moving object-detection device of a camera, comprising:

video signal output means for outputting a video signal representing an object to be photographed;

input means for inputting a position of a gazing point;

first storing means for storing a first video signal representing images which are included in a moving object detection zone and four corners of an image plane at a first timing, as basis signals, and second storing means for storing a second video signal representing images which are included in the moving object detection zone and the four corners of the image plane at a second timing after a predetermined time period from the first timing, as reference signals, the moving object detection zone being a part of an image represented by the video signal and the four corners being parts of the image represented by the video signal, and wherein the moving object detection zone has the gazing point and a periphery region which extends from the gazing point and comprises a plurality of divided zones such that the divided zones partially overlap each other;

contrast determination means for determining contrast of each of the images of the moving object detection zone and the four corners on the basis of the first video signals;

third storing means for storing a determination result indicating that the contrast of the divided zones of the moving object detection zone and the four images of the four corners is low, in association with a number assigned to the divided zone and the four images, respectively;

correlation calculation means for performing a correlation calculation with respect to said each of the images of the divided zones and the four corners which are represented by the first video signal and said each of the images of the divided zones and the four corners which are represented by the second video signal, in each of horizontal and vertical directions, thereby to obtain a correlation value, in association with a number assigned to an associated one of the divided zones and the four corners, respectively;

reliability determination means for determining reliability of the correlation value;

fourth storing means for storing a determination result indicating that the reliability of the correlation value of each of the images of the divided zones and the four corners is low, in association with a number assigned to an associated one of the divided zone and the four corners, respectively;

classifying means for classifying the images, which are other than the images determined to have low contrast or low reliability of the correlation value, thereby to determine whether or not the correlation value of said each of the images to be classified, in said each of the horizontal and vertical directions, falls within a predetermined range;

determination means for determining that the image included in the moving object detection zone is static when the number of the images, each of which has the correlation value determined to fall within the predetermined range, is one, the image included in the moving object detection zone has moved in a direction differing from a direction where the four images have moved, when the number of the images, each of which has the correlation value determined to fall within the predetermined range, is two, and the image included in the moving object detection zone is unable to be tracked when the number of the images, each of which has the correlation value determined to fall within the predetermined range, is three or more.

2. A moving object-detection device according to claim 1, wherein said first storing means stores the reference signals after updating the reference signals, when said determination means determines that the image included in the moving object detection zone is static.

3. A moving object-detection device according to claim 2, further comprising counting means for counting the number of times that the reference signals are updated, and determining one of the images which is determined to have a maximum contrast, as a track region, when said number of times reaches a predetermined value.

4. A moving object-detection device according to claim 1, further comprising display means for displaying the image included in the moving object detection zone when said determination means determines that the image included in the moving object detection zone has moved.

5. A moving object-detection device of a camera, comprising:

video signal output means for outputting a video signal representing an object to be photographed;

input means for inputting a position of a gazing point;

storing means for storing a first video signal representing images which are included in a moving object detection zone and peripheral areas defined in advance in an image plane, as basic signals, at a first time, and for storing a second video signal representing images included in the moving object detection zone and the peripheral areas of the image plane at a second time after a predetermined time period from the first time, as reference signals, the moving object detection zone and the peripheral areas being parts of an image represented by the first video signal, and wherein the moving object detection zone has the gazing point and a periphery region which extends from the gazing point and comprises a plurality of divided zones such that the divided zones partially overlap each other;

motion vector calculation means for performing a correlation calculation with respect to said each of the images represented by the first video signal and said each of the images represented by the second video signal, in two directions of the image plane, thereby to obtain a motion vector of said each of the images represented by the first video signal and said each of the images represented by the second video signal, in association with a number assigned to an associated one of the divided zone and the specific peripheral areas, respectively;

classifying means for classifying the motion vector of said each of the images of the divided zone and the peripheral areas, thereby to determine if each of the motion vectors of said each of the images represented by the first video signal and said each of the images represented by the second video signal falls within a predetermined range;

determination means for determining that the image included in the moving object detection zone is static when a number of the images, each of which has the correlation value determined to fall within the predetermined range, is one, the image included in the moving object detection zone has moved in a direction differing from a direction where the peripheral images have moved, when the number of the images, each of which has the correlation value determined to fall within the predetermined range, is two, and the image included in the moving object detection zone is unable to be tracked, when the number of the images, each of which has the correlation value determined to fall within the predetermined range, is three or more.

* * * * *